US010916072B2

(12) United States Patent
Bachant et al.

(10) Patent No.: US 10,916,072 B2
(45) Date of Patent: Feb. 9, 2021

(54) SELF-MAINTAINING AUTONOMOUS VEHICLE PROCEDURE (71) Applicant: GM Cruise Holdings LLC, San Francisco, CA (US)

(72) Inventors: Thomas Bachant, San Francisco, CA (US); Nadav Ullman, San Francisco, CA (US); Joseph Thibeault, San Francisco, CA (US); Jake McCloskey, San Francisco, CA (US); Paul Garcia, San Francisco, CA (US); Jose Arturo Covarrubias, San Francisco, CA (US); Michael Magnoli, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 16/410,911

(22) Filed: May 13, 2019

(65) Prior Publication Data
US 2020/0364949 A1  Nov. 19, 2020

(51) Int. Cl.
*G07C 5/08* (2006.01)
*G07C 5/00* (2006.01)
*G07C 5/02* (2006.01)
*G05D 1/00* (2006.01)
*G06F 16/28* (2019.01)

(52) U.S. Cl.
CPC ........... *G07C 5/006* (2013.01); *G05D 1/0088* (2013.01); *G06F 16/285* (2019.01); *G07C 5/02* (2013.01); *G07C 5/08* (2013.01)

(58) Field of Classification Search
None
See application file for complete search history.

(56) References Cited

U.S. PATENT DOCUMENTS

| | | | |
|---|---|---|---|
| 2014/0074345 A1* | 3/2014 | Gabay | G07C 5/08 701/31.4 |
| 2017/0123421 A1* | 5/2017 | Kentley | G08G 1/202 |
| 2017/0278312 A1* | 9/2017 | Minster | G05D 1/0297 |
| 2018/0315260 A1* | 11/2018 | Anthony | G06N 20/00 |
| 2019/0129789 A1* | 5/2019 | Koay | G06F 11/0739 |
| 2019/0197798 A1* | 6/2019 | Abari | G06Q 10/20 |
| 2019/0378350 A1* | 12/2019 | DeRouen | G06Q 10/02 |

* cited by examiner

*Primary Examiner* — Peter D Nolan
*Assistant Examiner* — Demetra R Smith-Stewart
(74) *Attorney, Agent, or Firm* — Polsinelli, PC (57) ABSTRACT

Systems and methods provide for enabling an autonomous vehicle to automatically and dynamically monitor and maintain itself. The autonomous vehicle can analyze diagnostic data captured by one or more of its sensors. Based on the analysis of the diagnostic data, the autonomous vehicle can determine that it needs maintenance and, based on that determination, send the analysis of the diagnostic data to a routing service. The autonomous vehicle can receive instruction from the routing service to dynamically route the autonomous vehicle in accordance with a maintenance action.

16 Claims, 5 Drawing Sheets

SELF-MAINTAINING AUTONOMOUS VEHICLE PROCEDURE

TECHNICAL FIELD

The subject matter of this disclosure relates in general to the field of rideshare vehicles, and more particularly, to systems and methods for self-maintenance of an autonomous rideshare vehicle.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, where the autonomous vehicle operates based upon sensor signals output by the sensor systems. Specifically, the sensor signals are provided to an internal computing system in communication with the plurality of sensor systems, where a processor executes instructions based upon the sensor signals to control a mechanical system of the autonomous vehicle, such as a vehicle propulsion system, a braking system, or a steering system.

Currently, a human operator needs to constantly monitor a fleet and drive an autonomous vehicle into a shop when it is deemed as needing repair. This requires checking quantitative and qualitative values against a range of acceptable values. Once repair is deemed necessary, the human operator must direct the autonomous vehicle to a garage. This can be a time consuming and error-prone process, especially as a fleet increases significantly in size or area of operation, since it relies on human intervention.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for self-maintenance capabilities of an autonomous vehicle. Currently, human intervention is needed to constantly monitor a fleet of vehicles. When someone monitoring it deems it needs repair, they need to then direct another service to drive the vehicle into a garage. This means that human intervention is needed to check quantitative and qualitative values against, say, a range of acceptable values, and human intervention is then needed again to get the vehicle to the garage for service. This requires constant attention and introduces opportunity for error or the escalation of vehicle issues, since only major issues may be flagged by human operators as needing service or repair.

To solve the above issues, systems and methods are disclosed for enabling an autonomous vehicle to automatically and dynamically monitor and maintain itself, which removes the need for human monitoring and intervention. The autonomous vehicle can, for example, analyze diagnostic data captured by one or more of its sensors. Based on the analysis of the diagnostic data, the autonomous vehicle can determine that it needs maintenance and, based on that determination, send the analysis of the diagnostic data to a routing service. The autonomous vehicle can then receive instruction from the routing service to dynamically route the autonomous vehicle in accordance with a maintenance action.

Figure 1:
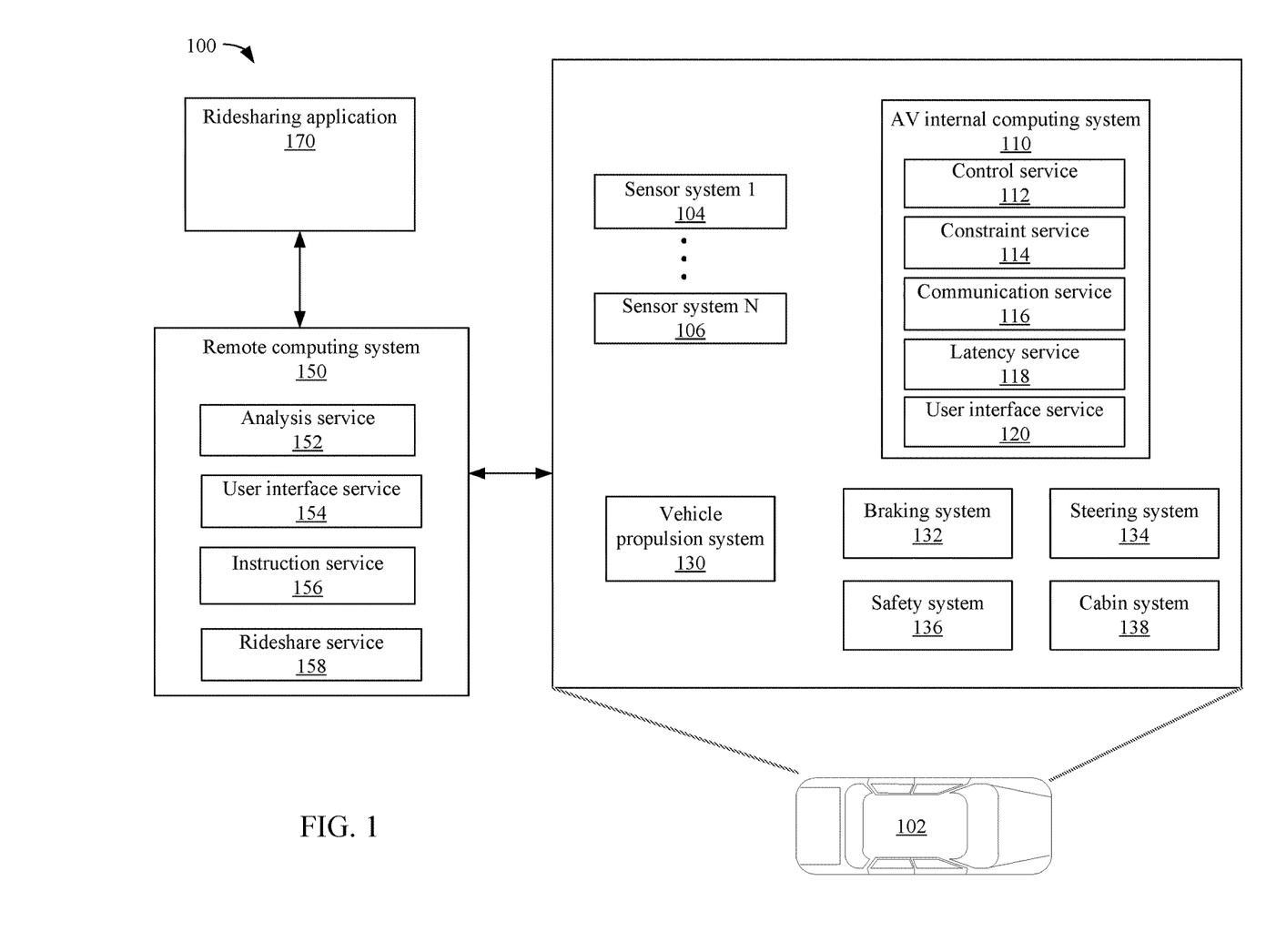
FIG. 1 illustrates an example schematic diagram of an autonomous vehicle and network environment, in accordance with some embodiments.

FIG. 1 illustrates environment 100 that includes an autonomous vehicle 102 in communication with a remote computing system 150. In some embodiments, the autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an autonomous vehicle (AV) AV internal computing system 110 that is in communication with the sensor systems 104-106 and the systems 130, 132, 134, 136, and 138. The AV internal computing system 110 includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The AV internal computing system 110 can include a control service 112 that is configured to control operation of the vehicle propulsion system 130, the braking system 132, the steering system 134, the safety system 136, and the cabin system 138. The control service 112 receives sensor signals from the sensor systems 104-106 as well as communicating with other services of the AV internal computing system 110 to effectuate operation of the autonomous vehicle 102. In some embodiments, control service 112 may carry out operations in concert with one or more other systems of autonomous vehicle 102.

The AV internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The AV internal computing system 110 can also include a communication service 116. The communication service 116 can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the AV internal computing system 110 are configured to send and receive communications to remote computing system 150 for such reasons as reporting data for training and evaluating machine learning algorithms, requesting assistance from remote computing system 150 or a human operator via remote computing system 150, software service updates, ridesharing pickup and drop off instructions, etc.

The AV internal computing system 110 can also include a latency service 118. The latency service 118 can utilize timestamps on communications to and from the remote computing system 150 to determine if a communication has been received from the remote computing system 150 in time to be useful. For example, when a service of the AV internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The AV internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing application 170 and can dispatch autonomous vehicle 102 for the trip. The rideshare service 158 can also act as an intermediary between the ridesharing application 170 and the autonomous vehicle 102 wherein a passenger might provide instructions to the autonomous vehicle 102 to go around an obstacle, change routes, honk the horn, etc.

Figure 2:
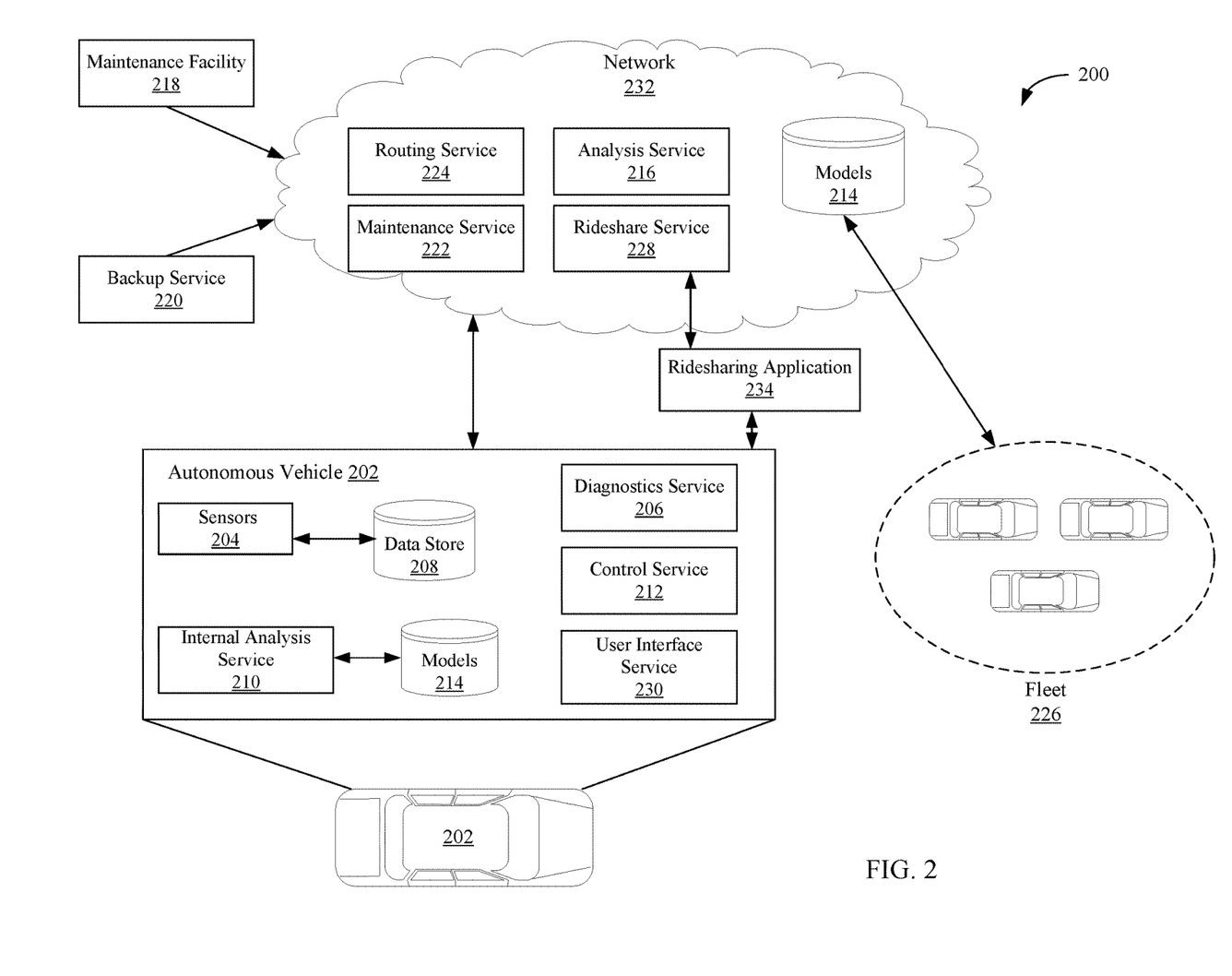
FIG. 2 illustrates an example schematic diagram of an autonomous vehicle and network environment that enables self-maintenance of an autonomous vehicle, in accordance with some embodiments.

FIG. 2 illustrates an example schematic diagram of an autonomous vehicle and network environment that enables self-maintenance of an autonomous vehicle, in accordance with some embodiments. System 200 can maintain a fleet of vehicles that are fully autonomous without human intervention and/or monitoring. Conventionally, the current system of maintaining a vehicle needs human intervention 13 the vehicle runs diagnostics, and if there's an issue flagged by someone monitoring the diagnostics, they would have to contact an employee at a maintenance facility, such as a shop, to see if the shop could work on the vehicle. This introduces human error and inefficiencies that could affect a fleet of autonomous vehicles that may need maintenance over time. System 200 leverages an increased diagnostic capability of an autonomous vehicle 202, such as an autonomous vehicle 202 within fleet 226, to remove the need for human intervention and/or monitoring. The diagnostic capabilities can be integrated into a dispatching algorithm that can dynamically and/or automatically send autonomous vehicles to needed facilities based on the severity of the issue(s). The diagnostic capabilities can apply to preventative maintenance (e.g., knowing that autonomous vehicle 202 need an oil change in 50 miles and, based on that, sending it to the nearest shop before the 50 miles is reached), and/or can apply to diagnosing more critical issues (e.g., one of the lidar sensors is broken or malfunctioning and needs to be sent to a shop immediately to fix or replace the lidar sensor).

Autonomous vehicle 202 can dynamically self-maintain itself by analyzing diagnostic data captured by one or more sensors 204 of the autonomous vehicle 202. Autonomous vehicle 202 can include a plurality of sensors 204 within multiple sensor systems including, but not limited to, a camera sensor system, a lidar sensor system, a radar sensor system, amongst others. The plurality of sensor systems can work independently or interoperably with each other in order to navigate and/or capture environmental and operational conditions. Sensors 204, for example, can detect or capture diagnostic data that will enable the autonomous vehicle 202 to monitor itself.

Each sensor 204 can store the diagnostic data within data store 208 on the autonomous vehicle 202. Internal analysis service 210 of autonomous vehicle 202 can, in some embodiments, generate one or more models 214 that describe the behavior, operation, or context of the autonomous vehicle 202 based on the diagnostic data within data store 208. For example, internal analysis service 210 can determine, based on models 214, the yaw, acceleration, orientation, location, and surroundings (e.g., buildings, people, obstacles, light levels, temperature, sounds, etc.) of autonomous vehicle 202.

Based on the analysis of the diagnostic data detecting an operational issue, autonomous vehicle 202 can determine that it needs maintenance. Diagnostics service 206, for example, can diagnose issues within the diagnostic data and make determinations about whether autonomous vehicle 202 needs maintenance and how critical the issue is. Diagnostics service 206, for example, can detect an operational issue by applying models 214 to the diagnostic data. For example, diagnostics service 206 can check against software versions, valid calibration values, etc. For instance, if autonomous vehicle's 202 yaw is beyond an acceptable value or value range, then diagnostics service 206 can compare the diagnostics data against models 214 to diagnose a specific issue. In some embodiments, most of the analysis of the diagnostics data is done on autonomous vehicle 202 (via diagnostics service 206) so as to provide immediate response to issues (or response despite a loss of connection to a remote network). In other embodiments, the analysis of the diagnostics data can be done on a back end, remote server.

Based on the determination of the specific issue, the analysis of the diagnostic data can be sent to a backend, remote network, such as network 232, which can route autonomous vehicle 202 via routing service 224 in accordance with the determination. For example, routing service 224 can send issues to maintenance service 222 to determine an appropriate response, such as routing autonomous vehicle 202 to a specific shop, notifying and setting up maintenance, picking up a stranded passenger, etc.

In some embodiments, diagnostics service 206 can additionally receive input from passengers within autonomous vehicle 202 providing feedback. For example, user interface service 230 can receive input from a passenger at a computer interface, such as a pad within autonomous vehicle 202 or through a ridesharing application 234 on the passenger's mobile device. The passenger can indicate at the user interface service 230 that there is an issue with the operation of autonomous vehicle 202, like a quick stop, a jerky turn, etc. In some instances, the passenger can assume manual control of autonomous vehicle through user interface service 230, which can communicate with control service 212 to operate autonomous vehicle 202 accordingly.

In some embodiments, models 214 can be continuously supplemented and updated by diagnostics data collected by the entire fleet 226. The diagnostics data can be transmitted to network 232 that can remotely compile and average the received diagnostics data from all vehicles within fleet 226 to generate models 214 remotely. For example, analysis service 216 can analyze the diagnostics data from fleet 226 to generate detailed, accurate models 214 that can then be applied to models 214 on autonomous vehicle 202 on its next update or connection to network 232. As a result, models 214 can be continuously trained as each autonomous vehicle 202 within fleet 226 operates over time. In some embodiments, models 214 on network 232 can be supplemented by passenger input through rideshare service 228 in communication with ridesharing application 234.

The determination that autonomous vehicle 202 needs maintenance based on the analysis of the diagnostic data from the entire fleet 226 can enable the detection of subtle or emerging operational issues with the autonomous vehicle 202. For example, for each sensor 204 that may be recording an issue, the diagnostic data from that sensor 204 can be compared against successful trips of other cars with that sensor (or unsuccessful trips). This can enable models 214 to constantly learn and improve criticality levels and other insights, such as what is the perfect level of charge, the perfect state of components of autonomous vehicle 202 for the best mileage or passenger experience, etc.

Diagnostics service 206 can also classify issues flagged by models 214 into different criticality levels. For example, a criticality level of an operational issue with the autonomous vehicle can be determined based on models 214 (and in some embodiments, based on models 214 continuously updated based on diagnostic data from the fleet 226). For example, an operational issue with autonomous vehicle 202 can be classified at a high criticality level based on diagnostics data being within or above a range of values that suggest that autonomous vehicle 202 is in immediate danger of failure or malfunction. Based on the operational issue being within the high criticality level, autonomous vehicle 202 can receive instruction from routing service 224 to bring the autonomous vehicle to a stop.

Additionally, at network 232, additional details can be stored and analyzed that would not be considered normally urgent or critical to autonomous vehicle's 202 operation (that would take up more processing time than desired if done locally). For example, autonomous vehicle 202 can report small maintenance issues like low tire pressure, low oil levels, and other persistent issues that can in the long run lead to urgent issues. The granular details within diagnostic data can be pulled out of data store 208 and/or internal analysis service 210 and stored/analyzed on the back end (such as via analysis service 216 on network 232 and used to modify/update models 214). Network 232 can determine how critical the granular details are for dispatch. For example, low tire pressure can be flagged based on the value of certain diagnostic data analysis service 216 receives. Routing service 224 can continue the current trip, and doesn't need to cancel the ride with a passenger. But if analysis service 216 determines it's serious enough, once the trip is finished, routing service 224 can be sent to control service 212 to route autonomous vehicle 202 to the next facility to fix the tire pressure.

In some embodiments, once the analysis of the diagnostic data is sent to routing service 224 based on the determination that autonomous vehicle 202 needs maintenance, autonomous vehicle 202 can receive instruction from routing service 224 to dynamically route autonomous vehicle 202 in accordance with a maintenance action specified by maintenance service 222. For example, maintenance service 222 can communicate with one or more maintenance facilities 218 to dynamically and automatically schedule maintenance for autonomous vehicle 202. Maintenance service 222 can also communicate with backup service 220 to send a backup vehicle to pick up a stranded passenger (e.g., for autonomous vehicles 202 that are experiencing urgent, dangerous issues).

For example, maintenance service 222 can take into consideration the current load at maintenance facilities 218. The total number of charging ports, for example, can be known for a given facility, as well as how many are actually available vs. used.

Maintenance service 222 can also take into consideration different maintenance facilities 218 having specific specialties, specific technicians, and/or specific parts. Some maintenance facilities 218 can be appropriate for maintenance, for example, while others are best for charging the autonomous vehicle 202. As a result, when autonomous vehicle 202 needs to automatically route itself to a maintenance facility 218, the maintenance facility 218 can be selected based on parameters such as directing the autonomous vehicle 202 to a shop that has the proper technicians with the proper parts to service the specific need of the autonomous vehicle 202. For example, certain maintenance facilities 218 can have technicians that specialize in lidar sensor systems. Other maintenance facilities 218 can have technicians that specialize in camera sensor systems, radar sensor systems, global positioning system (GPS) sensor systems, inertial measurement units (IMU), infrared sensor systems, laser sensor systems, sonar sensor systems, and/or the like. Still other maintenance facilities 218 can have technicians that specialize in more general vehicle systems, such as the autonomous vehicle's 202 propulsion system, braking system, steering system, safety system, cabin system (e.g., temperature control, lighting, etc.). Moreover, even within maintenance facilities 218 for charging autonomous vehicle 202, certain maintenance facilities 218 can have a certain number of charging stations that may have cars already plugged into them (e.g., a limited number of open charging stations that can service autonomous vehicle 202). In that case, that maintenance facility 218 may be passed for consideration in favor of another with availability.

In some embodiments, maintenance service 222 can weight certain actions depending on multiple priorities. For example, while some maintenance facilities 218 may be the best suited for a specific maintenance action, the maintenance facility 218 may be at capacity and cannot take autonomous vehicle 202—therefore, maintenance service 222 can communicate with routing service 224 to route autonomous vehicle 202 to another maintenance facility with availability that does not specialize in the specific maintenance action or is farther away from autonomous vehicle's 202 current position.

In some embodiments, autonomous vehicle 202 may be queued based on its priority level. Its priority level may be related to the issue's criticality level. For example, the queue may populate the top of its queue with the autonomous vehicles of fleet 226 that are suffering from high criticality issues and therefore need to go to a maintenance facility 218 straight away. Autonomous vehicles of fleet 226 with low criticality issues may be pushed further down the queue so that they are dispatched to a maintenance facility 218 when there is extra availability.

Figure 3A:
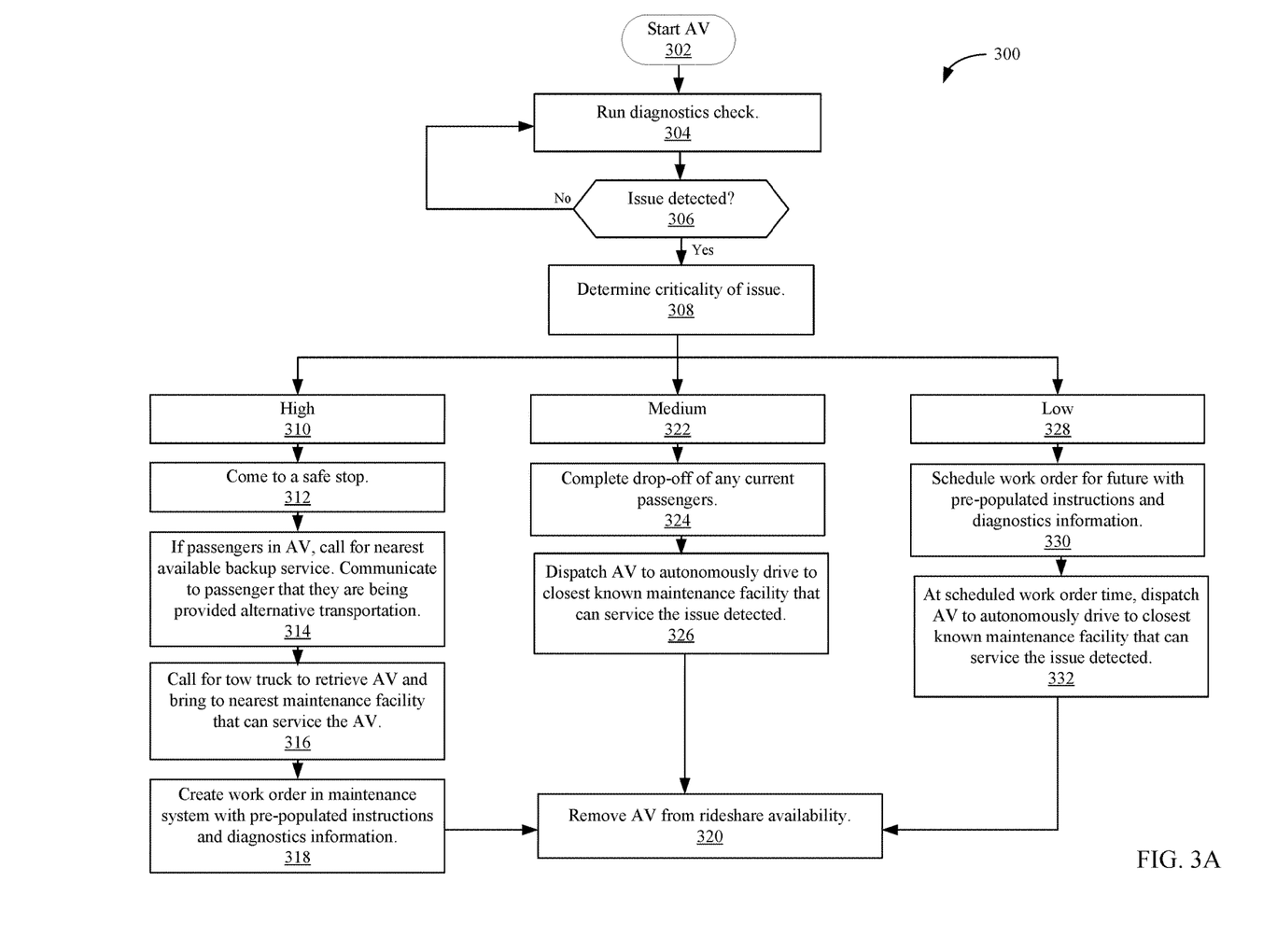
FIG. 3A illustrates a flowchart representation of the self-maintenance of an autonomous vehicle, in accordance with some embodiments.

FIG. 3A illustrates a flowchart representation of the self-maintenance of an autonomous vehicle, in accordance with some embodiments. Method 300 can begin upon startup of the autonomous vehicle (step 302). In some embodiments, startup can trigger a diagnostics check (step 304), which can check systems within the autonomous vehicles for any issues before the autonomous vehicle picks up a passenger or starts to operate on the road. Additionally and/or alternatively, in some embodiments, the diagnostics check (step 304) can be run on a continuous or periodic basis in order to monitor how the autonomous vehicle is operating over time. The diagnostics check can determine if there are any issues detected (step 306). If there are no issues detected, then the diagnostics check can be run at a subsequent time to check for issues again.

In some embodiments, the diagnostics check can raise a heartbeat event periodically (e.g., every 30 seconds) or continuously to check if a system is still alive (e.g., functioning properly). The systems being checked can respond to the heartbeat event, and can be logged as response events within a log. The response events can include diagnostics data for analysis of any issues being experienced by the corresponding system.

In some embodiments, upon startup, the diagnostics check can discover that a particular firmware version is out of date. For example, if the network has updated to a new version of firmware for the lidar system, a response event from the diagnostics check can detect that the older version is being used and the lidar system on the autonomous vehicle needs to be updated (and the update can be initiated once a link with the network is established). Or the response event from the diagnostics check can determine that version 1.5 of the firmware for the lidar system is broken, so either a patch or update needs to take place to fix the issue. The diagnostics check can contain a requirement list of needed sensors, versions, autonomous vehicle components, etc. Therefore, the diagnostics check can determine if the autonomous vehicle has a healthy lidar system, healthy radar system, etc. by monitoring and comparing diagnostics data to the requirement list.

In some embodiments the diagnostics checks may be done at different layers. At a first layer, for example, if the diagnostics check runs a certain group of checks against all hardware pieces, and those checks fail, the autonomous vehicle is not allowed or enabled to boot up. Once those checks pass, which can determine that all the basics of driving the autonomous vehicle has been satisfied, a secondary layer can check all the components of the autonomous vehicle in operation. The secondary layer may periodically or continuously transmit diagnostics information and data to the back end (e.g., the network) and confirm that all systems are running as desired (or a system is experiencing one or more issues). In some embodiments, if the first layer of the diagnostic check fails, then the system can flag the availability of the vehicle, providing information about whether the autonomous vehicle is unavailable for rideshare at all, or whether it's available for rideshare but in need of maintenance soon.

In some embodiments, the system can determine the criticality of any detected issues (step 308). For example, diagnostics data can be received from sensors on the autonomous vehicle during a diagnostics check, which can include information on how the sensors or components of the autonomous vehicle are operating. Models applied to the diagnostics data can analyze the diagnostics data in order to determine what issues the autonomous vehicle is experiencing (or is going to experience) (e.g., the issues can be predictive or purely diagnostic).

If the analysis of the diagnostics data determines that an issue is within a high criticality level (step 310), then the autonomous vehicle can come to a safe stop (step 312). For example, the diagnostics data can have values above or below a threshold value that indicates a critical and/or imminently urgent issue. If there are passengers within the autonomous vehicle, the system can call the nearest available backup service to pick them up (step 314). In some embodiments, the system can communicate to the passenger (via a pad within the autonomous vehicle, a notification within the rideshare application, etc.) that they are being provided alternative transportation. The system can call a tow truck to retrieve the autonomous vehicle and bring it to a maintenance facility (e.g., the nearest maintenance facility that has availability for the autonomous vehicle) that can service the autonomous vehicle (step 316). A work order can be created in the maintenance system with pre-populated instructions and diagnostics information (step 318). The autonomous vehicle can then be removed from rideshare availability (step 320).

For example, a work order can include pre-populated instructions customized to different maintenance facilities that have specific specialties, specific technicians, and/or specific parts. For example, some maintenance facilities can be appropriate for maintenance, while others are best for charging the autonomous vehicle. When the autonomous vehicle needs to automatically route itself to a maintenance facility, the maintenance facility can be selected and the system can pre-populate instructions within a work order for the maintenance facility based on certain parameters. These parameters can direct the autonomous vehicle to a shop that has the proper technicians with the proper parts to service the specific need of the autonomous vehicle. For example, a work order can be meant for a maintenance facility with technicians that specialize in lidar sensor systems, and can pre-populate instructions related to repairing the autonomous vehicle's lidar system. Other maintenance facilities 218 can have technicians that specialize in camera sensor systems, radar sensor systems, global positioning system (GPS) sensor systems, inertial measurement units (IMU), infrared sensor systems, laser sensor systems, sonar sensor systems, and/or the like, and so the work order can be pre-populated with instructions for repairing the autonomous vehicle's corresponding system. Still other maintenance facilities can have technicians that specialize in more general vehicle systems, such as the autonomous vehicle's propulsion system, braking system, steering system, safety system, cabin system (e.g., temperature control, lighting, etc.); the work order can correspondingly be pre-populated with instructions for repairing the autonomous vehicle's specific system that needs repair. Some maintenance facilities are used for charging the autonomous vehicle, and can have a certain number of charging stations that may have cars already plugged into them (e.g., a limited number of open charging stations that can service autonomous vehicle). In that case, a work order can be generated for a maintenance facility with availability by pre-populating the work order with instructions to charge the autonomous vehicle. Diagnostics information related to the issue for repair may be included as well.

If the analysis of the diagnostics data determines that an issue is within a medium criticality level (step 322), then the autonomous vehicle can finish its current operations before being dispatched to an appropriate maintenance facility. A medium criticality level can be determined when the diagnostics data has values within a range that indicates that a problem, while not critical or imminently urgent, is an issue that should be fixed within a certain period of time. For example, since there are multiple cameras in the autonomous vehicle, when one camera goes out, the autonomous vehicle can still operate safely until the camera is fixed. In this case, the autonomous vehicle can complete the drop-off of any passengers (step 324), and before the certain period of time has passed, dispatch the autonomous vehicle to autonomously drive to a maintenance facility (e.g., the nearest maintenance facility that has availability for the autonomous vehicle) that can service the issue detected by the autonomous vehicle (step 326). This can be done through a work order created by pre-populating instructions and/or including diagnostics information, similar to that discussed above. The autonomous vehicle can then be removed from rideshare availability (step 320).

If the analysis of the diagnostics data determines that an issue is within a low criticality level (step 328), then a work order can be scheduled for the future with pre-populated instructions and diagnostics information (e.g., the work order can be scheduled for a time when there is availability and the autonomous vehicle is not booked with a passenger) (step 330). This can be done through a work order created by pre-populating instructions and/or including diagnostics information, similar to that discussed above. At the scheduled work order time, the autonomous vehicle can be dispatched to autonomously drive to a maintenance facility (e.g., the nearest maintenance facility that has availability for the autonomous vehicle) that can service the issue detected by the autonomous vehicle (step 332). A low criticality level can be determined when the diagnostics data has values below a threshold that indicates that a problem is not critical or imminently urgent.

In some embodiments, the autonomous vehicle can recalibrate its sensors. For example, a camera may not be properly detecting or seeing the world. This can indicate that it isn't properly calibrated. Depending on how far the current calibration values deviate from the expected range, a criticality of the calibration issue may be determined by the system. The autonomous vehicle may then be dispatched to drive to the closest place to recalibrate its sensors. In some embodiments, the autonomous vehicle may be routed to a checked billboard on a highway that enables the sensors within the autonomous vehicle to recalibrate.

Figure 3B:
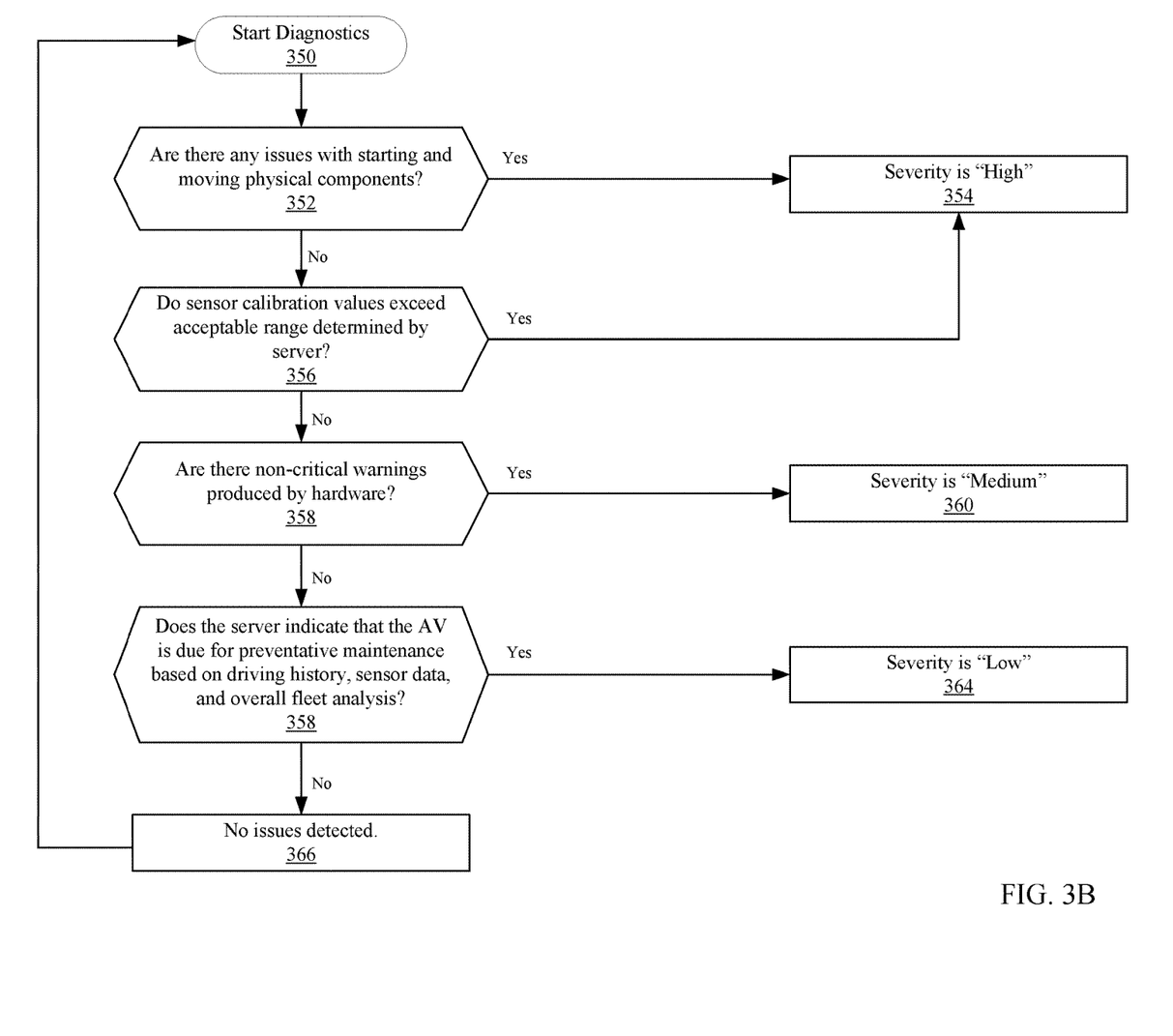
FIG. 3B illustrates a flowchart representation of criticality determinations for detected issues, in accordance with some embodiments.

FIG. 3B illustrates a flowchart representation of criticality determinations for detected issues, in accordance with some embodiments. The autonomous vehicle can start diagnostics (step 350), such as through a continuous or periodic diagnostics check through a diagnostics service that can detect one or more issues experienced by or anticipated by the autonomous vehicle. If the diagnostics service determines that there are any issues with starting and moving the physical components of the autonomous vehicle (step 352), then the criticality level is classified as high (step 354). If the diagnostics service determines that sensor calibration values exceed an acceptable range determined by the server in the back end (e.g., remote network) (step 356), then the criticality level is also classified as high (step 354).

However, if the diagnostics service does not detect the above, but does detect that there are non-critical warnings produced by hardware within the autonomous vehicle (step 358), then the criticality level is classified as medium (step 360).

If not, and the diagnostics service or remote back end server indicates that the autonomous vehicle is due for preventative maintenance (step 362), then the criticality level is classified as low (step 364). In some embodiments, the need for preventive maintenance can be based on driving history, sensor data, and/or overall fleet performance and analysis. If no issues are detected (step 366), then the diagnostics may either end or be deferred for a subsequent time.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 4:
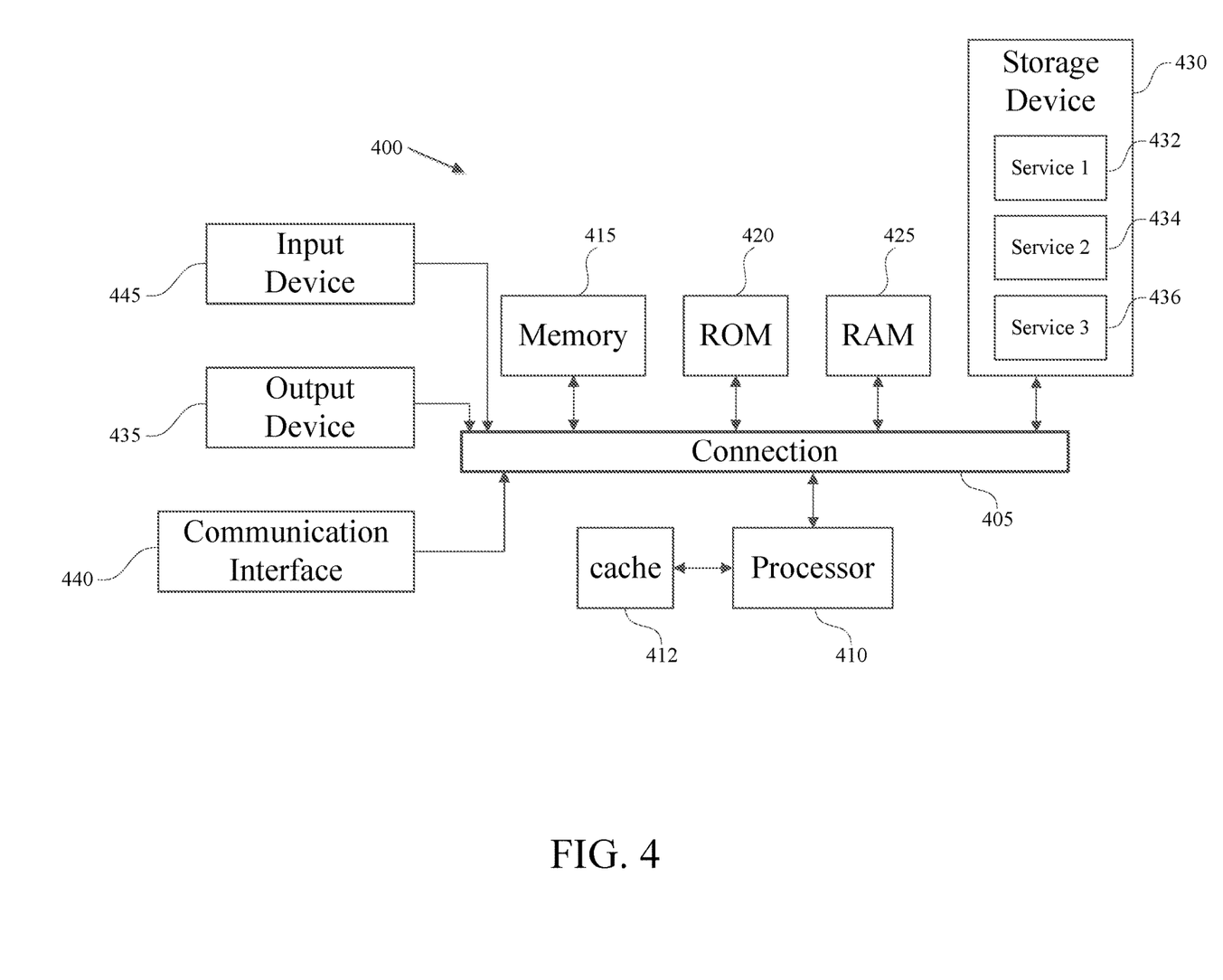
FIG. 4 shows an example of a system for implementing certain aspects of the present technology.

FIG. 4 shows an example of computing system 400, which can be for example any computing device making up internal computing system 110, remote computing system 150, (potential) passenger device executing rideshare app 170, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of self-maintaining an autonomous vehicle comprising:
    receiving a model of autonomous vehicle operations from a remote analysis service, wherein the model of autonomous vehicle operations defines an acceptable value range, the acceptable value range continuously updated by a fleet of autonomous vehicles as the fleet of autonomous vehicles navigates;
    analyzing diagnostic data captured by a sensor of the autonomous vehicle;
    based on the analysis of the diagnostic data exceeding the acceptable value range, determining that the autonomous vehicle needs maintenance;
    based on the determination, sending the analysis of the diagnostic data to a routing service and receiving an instruction from the routing service to automatically navigate the autonomous vehicle in accordance with a maintenance action;
    classifying an operational issue with the autonomous vehicle at a first criticality level;
    based on the operational issue being within the first criticality level, receiving an instruction from the routing service to bring the autonomous vehicle to a stop;
    determining, by the sensor, that a passenger is within the autonomous vehicle; and
    based on the determination, sending a request for a backup service and inform the passenger that the backup service is to provide alternative transportation.

2. The method of claim 1, wherein the determination that the autonomous vehicle needs maintenance is based on the analysis of the diagnostic data detecting an operational issue with the autonomous vehicle, wherein the analysis is in accordance with a model of autonomous vehicle operations generated by the fleet of autonomous vehicles.

3. The method of claim 2, wherein a criticality level of an operational issue with the autonomous vehicle is determined based on the model, and wherein the model is continuously updated based on diagnostic data collected from the fleet over time.

4. The method of claim 1, further comprising:
    classifying an operational issue with the autonomous vehicle at a second criticality level; and
    based on the operational issue being within the second criticality level, receiving an instruction from the routing service to navigate the autonomous vehicle to a maintenance facility that can service the operation issue after determining a passenger within the autonomous vehicle has been dropped off by the autonomous vehicle.

5. The method of claim 1, further comprising:
    classifying an operational issue with the autonomous vehicle at a third criticality level;
    based on the operational issue being within the third criticality level, receiving confirmation from the routing service that a work order has been placed at a scheduled time with a maintenance facility including specific technician types that can service the operation issue; and
    receiving an instruction from the routing service to navigate the autonomous vehicle to the maintenance facility that can service the operation issue at the scheduled time.

6. The method of claim 1, further comprising:
    sending one or more portions of the diagnostic data determined to be under a particular criticality level to the remote analysis service in order to update the acceptable value range defined by the model of autonomous vehicle operations for the fleet of autonomous vehicles.

7. A system comprising:
    one or more sensors of an autonomous vehicle; and
    a processor for executing instructions stored in memory, wherein execution of the instructions by the processor executes:
        receiving a model of autonomous vehicle operations from a remote analysis service, wherein the model of autonomous vehicle operations defines an acceptable value range, the acceptable value range continuously updated by a fleet of autonomous vehicles as the fleet of autonomous vehicles navigates;
        analyzing diagnostic data captured by the one or more sensors of the autonomous vehicle;
        based on the analysis of the diagnostic data exceeding the acceptable value range, determining that the autonomous vehicle needs maintenance;
        based on the determination, sending the analysis of the diagnostic data to a routing service and receiving an instruction from the routing service to automatically navigate the autonomous vehicle in accordance with a maintenance action;
        classifying an operational issue with the autonomous vehicle at a first criticality level;
        based on the operational issue being within the first criticality level, receiving an instruction from the routing service to bring the autonomous vehicle to a stop;
        determining, by the one or more sensors, that a passenger is within the autonomous vehicle; and based on the determination, sending a request for a backup service and informing the passenger that the backup service is to provide alternative transportation.

8. The system of claim 7, wherein the determination that the autonomous vehicle needs maintenance is based on the analysis of the diagnostic data detecting an operational issue with the autonomous vehicle, wherein the analysis is in accordance with a model of autonomous vehicle operations generated by the fleet of autonomous vehicles.

9. The system of claim 8, wherein a criticality level of an operational issue with the autonomous vehicle is determined based on the model, and wherein the model is continuously updated based on diagnostic data collected from the fleet over time.

10. The system of claim 7, wherein execution of the instructions by the processor further executes:
classifying an operational issue with the autonomous vehicle at a second criticality level; and
based on the operational issue being within the second criticality level, receiving an instruction from the routing service to navigate the autonomous vehicle to a maintenance facility that can service the operation issue after determining a passenger within the autonomous vehicle has been dropped off by the autonomous vehicle.

11. The system of claim 7, wherein execution of the instructions by the processor further executes:
classifying an operational issue with the autonomous vehicle at a third criticality level;
based on the operational issue being within the third criticality level, receiving confirmation from the routing service that a work order has been placed at a scheduled time with a maintenance facility including specific technician types that can service the operation issue; and
receiving an instruction from the routing service to navigate the autonomous vehicle to the maintenance facility that can service the operation issue at the scheduled time.

12. A non-transitory computer readable medium comprising instructions, the instructions, when executed by a computing system, cause the computing system to:
receive a model of autonomous vehicle operations from a remote analysis service, wherein the model of autonomous vehicle operations defines an acceptable value range, the acceptable value range continuously trained by a fleet of autonomous vehicles as the fleet of autonomous vehicles navigates;
analyze diagnostic data captured by a sensor of an autonomous vehicle, wherein the analysis is in accordance with the model of autonomous vehicle operations;
based on the analysis of the diagnostic data, determine that the autonomous vehicle needs maintenance; and
based on the determination, send the analysis of the diagnostic data to a routing service and receive instruction from the routing service to automatically navigate the autonomous vehicle in accordance with a maintenance action;
classify an operational issue with the autonomous vehicle at a first criticality level;
based on the operational issue being within the first criticality level, receive instruction from the routing service to bring the autonomous vehicle to a stop;
determine, by the sensor, that a passenger is within the autonomous vehicle; and
based on the determination, send a request for a backup service and inform the passenger that the backup service is to provide alternative transportation.

13. The non-transitory computer readable medium of claim 12, wherein the determination that the autonomous vehicle needs maintenance is based on the analysis of the diagnostic data detecting an operational issue with the autonomous vehicle, wherein the analysis is in accordance with a model of autonomous vehicle operations generated by the fleet of autonomous vehicles.

14. The non-transitory computer readable medium of claim 13, wherein a criticality level of an operational issue with the autonomous vehicle is determined based on the model, and wherein the model is continuously updated based on diagnostic data collected from the fleet over time.

15. The non-transitory computer readable medium of claim 12, the instructions further causing the computing system to:
classify an operational issue with the autonomous vehicle at a second criticality level; and
based on the operational issue being within the second criticality level, receive instruction from the routing service to navigate the autonomous vehicle to a maintenance facility that can service the operation issue after determining a passenger within the autonomous vehicle has been dropped off by the autonomous vehicle.

16. The non-transitory computer readable medium of claim 12, the instructions further causing the computing system to:
classify an operational issue with the autonomous vehicle at a third criticality level;
based on the operational issue being within the third criticality level, receive confirmation from the routing service that a work order has been placed at a scheduled time with a maintenance facility including specific technician types that can service the operation issue; and
receive instruction from the routing service to navigate the autonomous vehicle to the maintenance facility that can service the operation issue at the scheduled time.

* * * * *